United States Patent
Thakkar et al.

(10) Patent No.: US 12,481,575 B2
(45) Date of Patent: Nov. 25, 2025

(54) SYSTEM AND METHOD FOR AUTOMATED TEST CASE GENERATION BASED ON QUEUING CURVE ANALYSIS

(71) Applicant: Dell Products L.P., Round Rock, TX (US)

(72) Inventors: Bina Thakkar, Cary, NC (US); David C. Waser, Holly Springs, NC (US); Ashish Arvindbhai Pancholi, Cary, NC (US)

(73) Assignee: Dell Products L.P., Round Rock, TX (US)

( * ) Notice: Subject to any disclaimer, the term of this patent is extended or adjusted under 35 U.S.C. 154(b) by 546 days.

(21) Appl. No.: 18/048,557

(22) Filed: Oct. 21, 2022

(65) Prior Publication Data

US 2024/0134779 A1 Apr. 25, 2024
US 2024/0232057 A9 Jul. 11, 2024

(51) Int. Cl.
*G06F 11/3668* (2025.01)
*G06F 18/23213* (2023.01)

(52) U.S. Cl.
CPC .... *G06F 11/3684* (2013.01); *G06F 18/23213* (2023.01)

(58) Field of Classification Search
CPC .............. G06F 11/301; G06F 11/3414; G06F 11/3447; G06F 11/3452; G06F 11/3668; G06F 11/3672; G06F 11/3684; G06F 11/3688; G06F 18/23213; G06F 9/5072; G06N 20/00; H04L 41/0823;
(Continued)

(56) References Cited

U.S. PATENT DOCUMENTS

2005/0018611 A1* 1/2005 Chan ................... H04L 43/55
  709/224
2014/0244643 A1* 8/2014 Basak ................ G06F 11/3414
  707/737
(Continued)

FOREIGN PATENT DOCUMENTS

EP            3644558 A1 * 4/2020 ............. H04L 43/50
WO    WO-2021126272 A1 * 6/2021 ........... G06F 9/5027

OTHER PUBLICATIONS

Haranas, Mark. "Dell to Make 'All Offerings' As-A-Service, Says Michael Dell." Retrieved from url: https://www.crn.com/news/data-center/dell-to-make-all-offerings-as-a-service-says-michael-dell, Sep. 14, 2020.

*Primary Examiner* — Christopher Biagini
(74) *Attorney, Agent, or Firm* — McDermott Will & Schulte LLP

(57) ABSTRACT

A system for generating test cases with workload mixes for a set of target information handling systems includes gathering workload data from a plurality of information handling systems, dividing the workload data into a plurality of workload data bins, identifying workload data characteristics for each workload data bin and identifying workload data sets that may be applicable to a set of target information handling systems. A workload mix may be determined based on workload characteristics of the set of target information handling systems. Real customer workload data including real-time or near real-time workload data may be used to check a test case for accuracy before deploying a test case to a target information handling system.

20 Claims, 7 Drawing Sheets

(58) Field of Classification Search
CPC ... H04L 41/0896; H04L 41/14; H04L 41/142;
H04L 41/145; H04L 41/147; H04L 41/16;
H04L 41/5009; H04L 41/5019; H04L
41/5032; H04L 43/04; H04L 47/2425;
H04L 67/1001; H04L 67/1008
See application file for complete search history.

(56) References Cited

U.S. PATENT DOCUMENTS

| | | | |
|---|---|---|---|
| 2022/0121633 A1* | 4/2022 | Quader | G06F 16/213 |
| 2022/0253689 A1* | 8/2022 | Lange | G06N 20/10 |
| 2022/0308976 A1* | 9/2022 | Nagarajegowda | G06F 11/3414 |

* cited by examiner

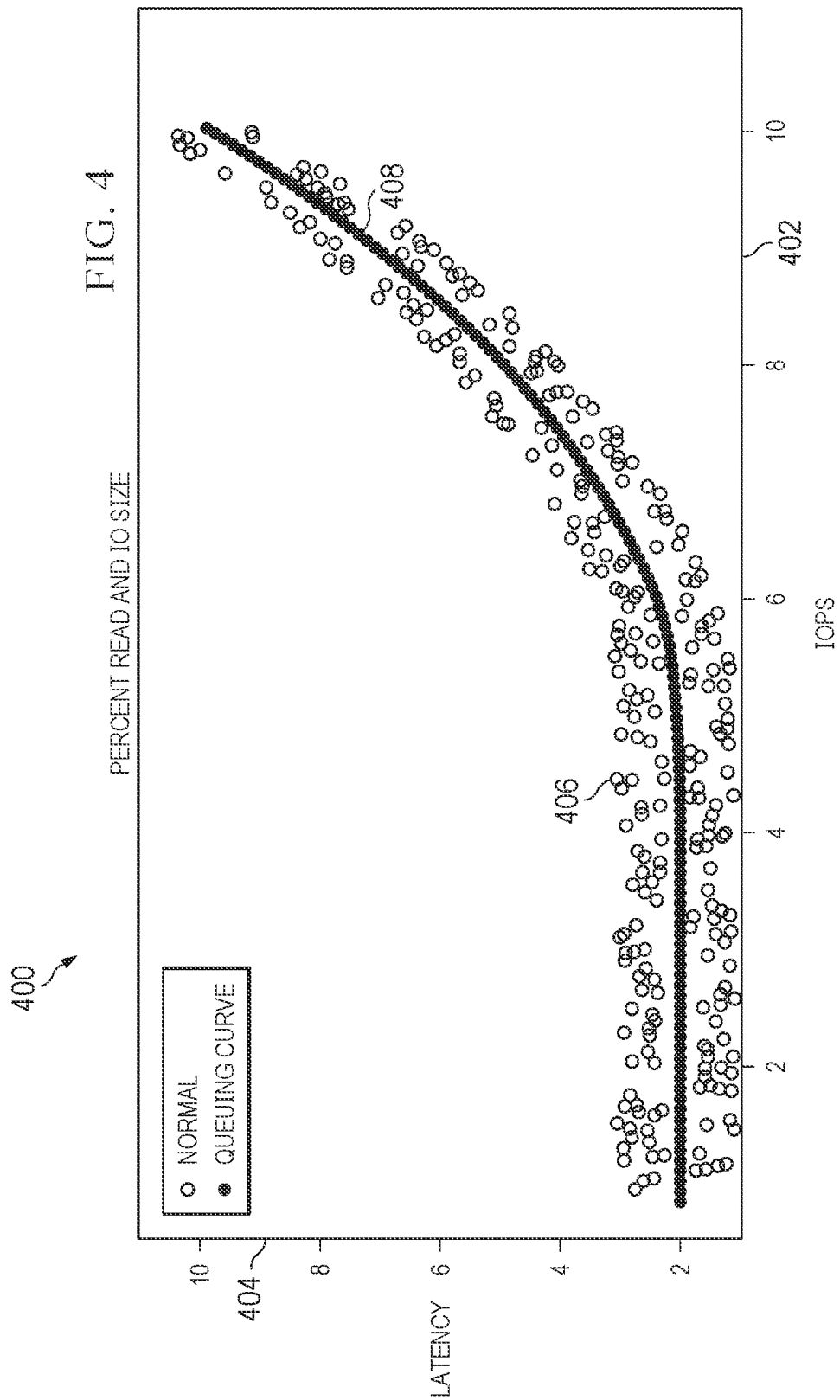

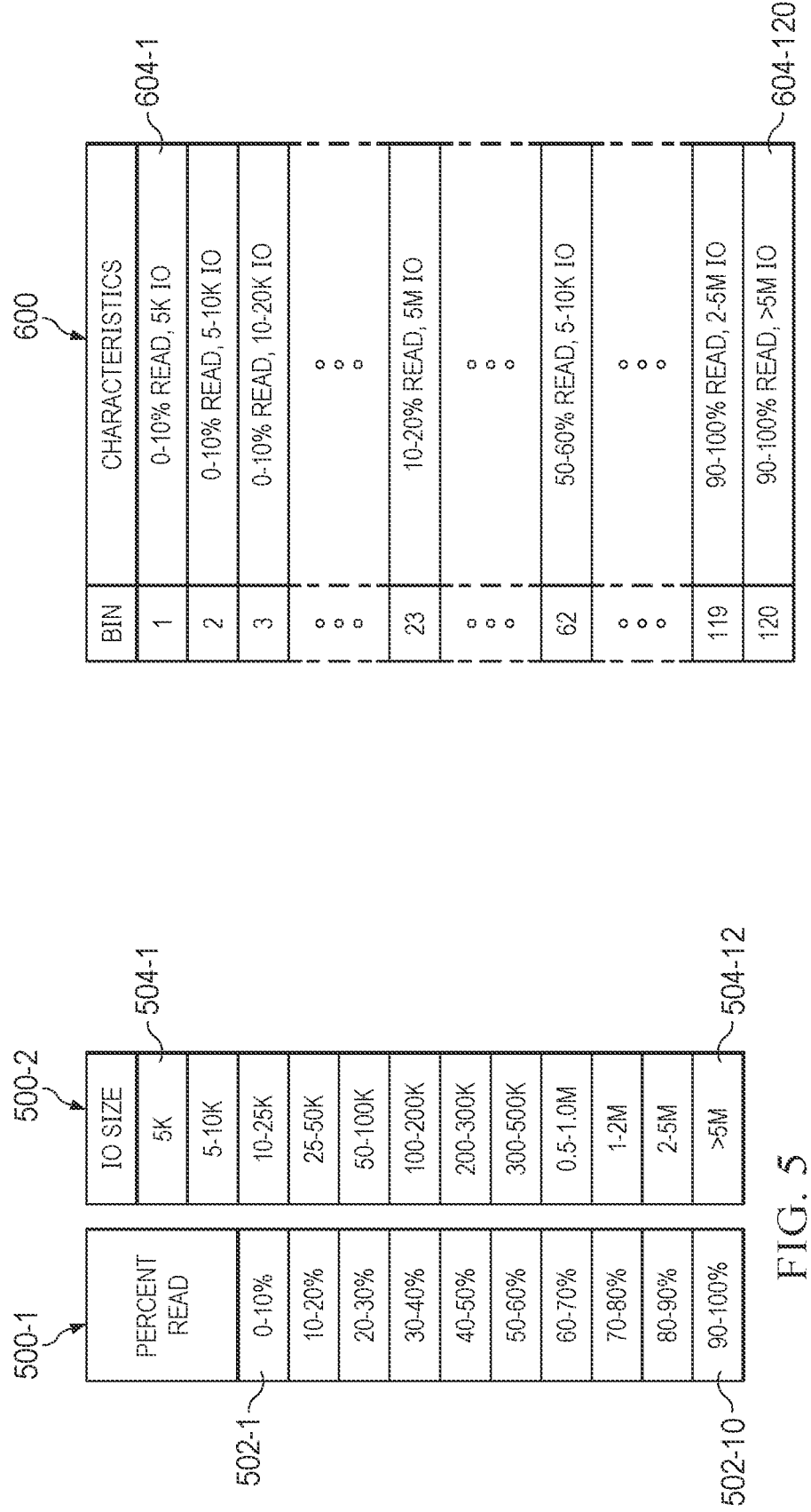

| CUSTOMER | INDUSTRY | SYSTEM | % READ 10-20% IO SIZE 5K | ... | % READ 30-40% IO SIZE 10-25K | % READ 40-50% IO SIZE 10-25K | % READ 50-60% IO SIZE 10-25K | % READ 60-70% IO SIZE 10-25K | ... | % READ 90-100% IO SIZE 2-5M | % READ 90-100% IO SIZE >5M |
|---|---|---|---|---|---|---|---|---|---|---|---|
| C1 | I1 | S1 | 1 | 1 | 0 | 1 | 1 |  |  |  | 0 |
| C1 | I1 | S2 | 0 | 0 | 0 |  | 1 |  |  | 1 | 1 |
| C2 | I2 | S3 | 1 | 1 | 1 |  | 1 |  | 1 | 1 |  |
| CN | IN | S4 | 1 |  | 1 |  | 1 | 1 |  | 1 | 0 |

FIG. 7

SYSTEM AND METHOD FOR AUTOMATED TEST CASE GENERATION BASED ON QUEUING CURVE ANALYSIS

BACKGROUND

Field of the Disclosure

This disclosure relates generally to information handling systems and, more particularly, to methods for generating test cases for information handling systems to process a range of workloads.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

User systems may have multiple information handling systems that support a variety of workloads associated with processing, storing and communicating information. Each of the different kinds of workloads puts different kinds of unique loads on the user systems. In addition, use systems in different industries will have different kinds of workloads. For example, a storage system for a financial company will have different workloads than a storage system for a medical imaging company. Also, workloads are not static and may constantly change. It is challenging to be aware of different kind of workloads supported by various user systems.

SUMMARY

Embodiments may be directed to a method of generating a set of test cases for a set of target information handling systems. The method may comprise receiving workload data corresponding to a plurality of information handling systems, dividing the workload data into a plurality of workload data bins, clustering the portion of the workload data in each workload data bin of the plurality of workload data bins based on a set of workload characteristics for a set of target information handling systems, determining a plurality of workload mixes based on the plurality of workload data bins and the set of workload characteristics, and generating a set of test cases for the set of target information handling systems, wherein each test case comprises a set of workload mixes of the plurality of workload mixes. Each workload data bin may contain a portion of the workload data based on at least one workload data characteristic of a plurality of workload data characteristics.

In some embodiments, dividing the workload data into the plurality of workload data bins comprises executing an algorithm based on a queuing theory. In some embodiments, the method comprises determining a set of block inputs and a set of file inputs for the workload data, wherein a workload mix of the plurality of workload mixes comprises the set of block inputs and the set of file inputs. In some embodiments, clustering comprises K-means clustering. In some embodiments, receiving the workload data comprises receiving the workload data for a period from a data repository. In some embodiments, the method comprises deploying a test case of the set of test cases to the set of target information handling systems, wherein the workload data comprises real-time or near-real time workload data. In some embodiments, the method comprises determining the set of workload characteristics for the set of target information handling systems, wherein each workload characteristic is associated with one or more of a user system, a customer, and an industry.

Embodiments may be directed to a test case generation system for generating a set of test cases for a set of target information handling systems. A test case generation system may comprise a test case information handling system configured to receive workload data corresponding to a plurality of information handling systems, divide the workload data into a plurality of workload data bins based on at least one workload data characteristic of a plurality of workload data characteristics, cluster the portion of the workload data in each workload data bin of the plurality of workload data bins based on a set of workload characteristics for the set of target information handling systems, determine a workload mix based on the plurality of workload data bins and the set of workload characteristics, and generate a set of test cases for the set of target information handling systems, wherein each test case comprises a set of workload mixes of the plurality of workload mixes. Each workload data bin may contain a portion of the workload data.

In some embodiments, the test case information handling system is configured to execute an algorithm based on queuing theory to divide the workload data into the plurality of workload data bins. In some embodiments, the test case information handling system is configured to determine a set of block inputs and a set of file inputs for the workload data, wherein the test case comprises the set of block inputs and the set of file inputs. In some embodiments, the test case information handling system is configured to cluster the workload data based on K-means clustering. In some embodiments, the system further comprises a data repository, wherein the test case information handling system is configured to receive the workload data from the data repository and the workload data corresponds to a time period. In some embodiments, the test case information handling system is configured to communicate with the data repository to receive real-time or near-real time workload data and deploy the test case to the target information handling system. In some embodiments, the test case information handling system is configured to determine a set of workload characteristics for the set of target information handling systems, wherein each workload characteristic is associated with one or more of a user system, a customer, and an industry.

Embodiments may be directed to a test case information handling system for generating a test case for a set of target information handling systems. A test case information handling system may comprise a memory device and a processor. The memory device may be configured to store workload data corresponding to a plurality of information handling systems. The processor may be configured to execute instructions to divide the stored workload data into a plurality of workload data bins based on at least one workload data characteristic of a plurality of workload data characteristics, cluster the portion of the workload data in each workload data bin of the plurality of workload data bins based on a set of workload characteristics for the set of target information handling systems, determine a workload mix based on the plurality of workload data bins and the set of workload characteristics and generate the test case for the set of target information handling systems using the workload mix. Each workload data bin may contain a portion of the workload data.

In some embodiments, the test case information handling system is configured to execute an algorithm based on queuing theory to divide the workload data into the plurality of workload data bins. In some embodiments, the test case information handling system is configured to determine a set of block inputs and a set of file inputs for the workload data, wherein the test case comprises the set of block inputs and the set of file inputs. In some embodiments, the test case information handling system is configured to cluster the workload data based on K-means clustering. In some embodiments, the test case information handling system is configured to receive the workload data from a data repository, wherein the workload data corresponds to a period. In some embodiments, the test case information handling system is configured to communicate with the data repository to receive real-time or near-real time workload data and deploy the test case to the target information handling system.

BRIEF DESCRIPTION OF THE DRAWINGS

For a more complete understanding of the invention and its features and advantages, reference is now made to the following description, taken in conjunction with the accompanying drawings, in which:

FIG. 4 is a graph illustrating a distribution of workload data for a sample workload data based on % READ and IO size characteristics;

FIG. 5 is a chart depicting a plurality of data structures containing workload data characteristics for dividing workload data into a plurality of workload data bins;

FIG. 6 is a chart depicting a plurality of workload information bins;

FIG. 7 is a data structure depicting values for various workload data characteristics for a plurality of workload data bins.

DESCRIPTION OF PARTICULAR EMBODIMENT(S)

Figure 1:
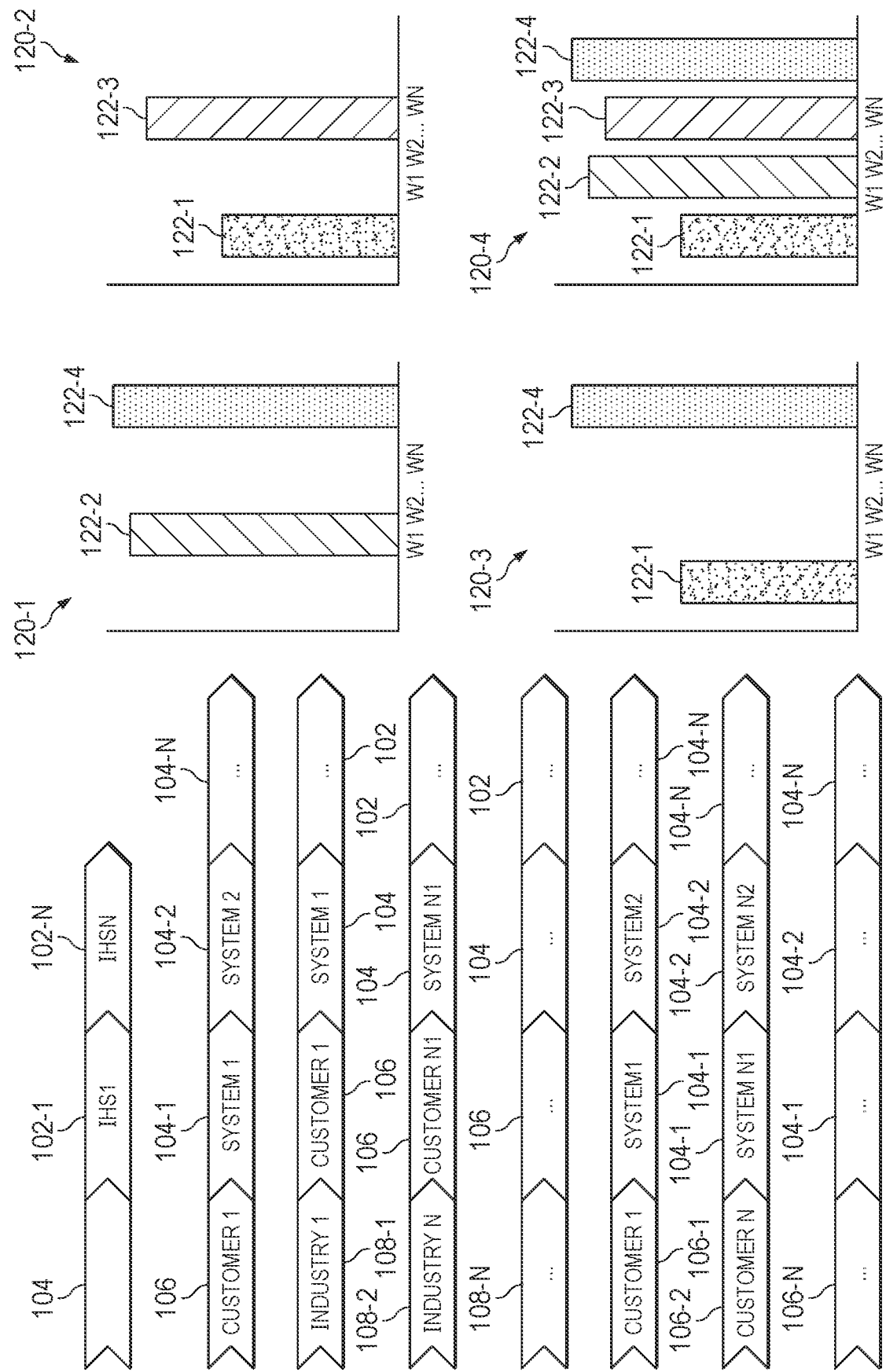
FIG. 1 is a diagram illustrating a plurality of information handling systems, illustrating variations in user systems associated with different customers and industries.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, system "104-1" refers to an instance of a user system, which may be referred to collectively as user systems "104" and any one of which may be referred to generically as user system "104."

As used herein, the term "workload data" may refer to data associated with processing, storage or networking operations for a single information handling system or multiple information handling systems in an array of information handling systems. Workload data may correspond to a single user system or multiple user systems. Workload data may be communicated from hundreds or thousands of user systems over a network and collected in a data repository, and may include workload data for user systems in multiple industries. User system for various industries may have information handling systems for storage operations, processing operations, networking operations or some combination. For example, workload data may be collected from information handling systems used for networking operations by cellular providers (e.g., cellular provider industry), with each cellular provider having multiple cellular locations and multiple information handling systems at each cellular location.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and one or more video displays. The information handling system may also include one or more buses operable to transmit communication between the various hardware components.

Embodiments disclosed herein are described with respect to networking operations but may also be practiced with other operations. Particular embodiments are best understood by reference to FIGS. 1-8, wherein like numbers are used to indicate like and corresponding parts.

Turning to the drawings, FIG. 1 depicts a diagram illustrating a plurality of information handling systems 102 and how a set of information handling systems 102-1 to 102-N may be associated with a user system 104 and how a set of user systems 104-1 to 104-N may be associated with a customer 106 and/or an industry 108. Each information handling system 102 may be configured for a particular purpose, such as for processing information related to networking (e.g., networking operations) in a user system 104 (e.g., a cellular tower) for a customer 106 (e.g., a cellular service provider) in an industry 108 (e.g., cellular service).

Embodiments disclosed herein may receive workload data from a plurality of information handling systems 102, analyze the workload data and generate a set of test cases 120 for a set of target information handling systems 102 that may be different from the plurality of information handling systems 102. A set of test cases 120 may be stored and/or deployed for various uses. For example, information handling system designers may use a set of test cases 120 to validate that a target information handling system 102 will meet manufacturing requirements, or an end user or third party may use a set of test cases 120 to verify that a target information handling system 102 or user system 104 will meet end user requirements. Each set of test cases 120 may be comprised of a plurality of workload mixes 122 generated based on the target information handling system 102, user system 104, customer 106 or industry 108. As depicted in FIG. 1, each test case 120 may contain multiple workloads (e.g., workloads W1 to WN), wherein the number of workloads may be a few (e.g., 2-9) for a basic workload mix to tens (e.g., 10-99) or more (e.g., 100+) for more accurate workload mixes based on the set of target information handling systems 102.

Figure 2:
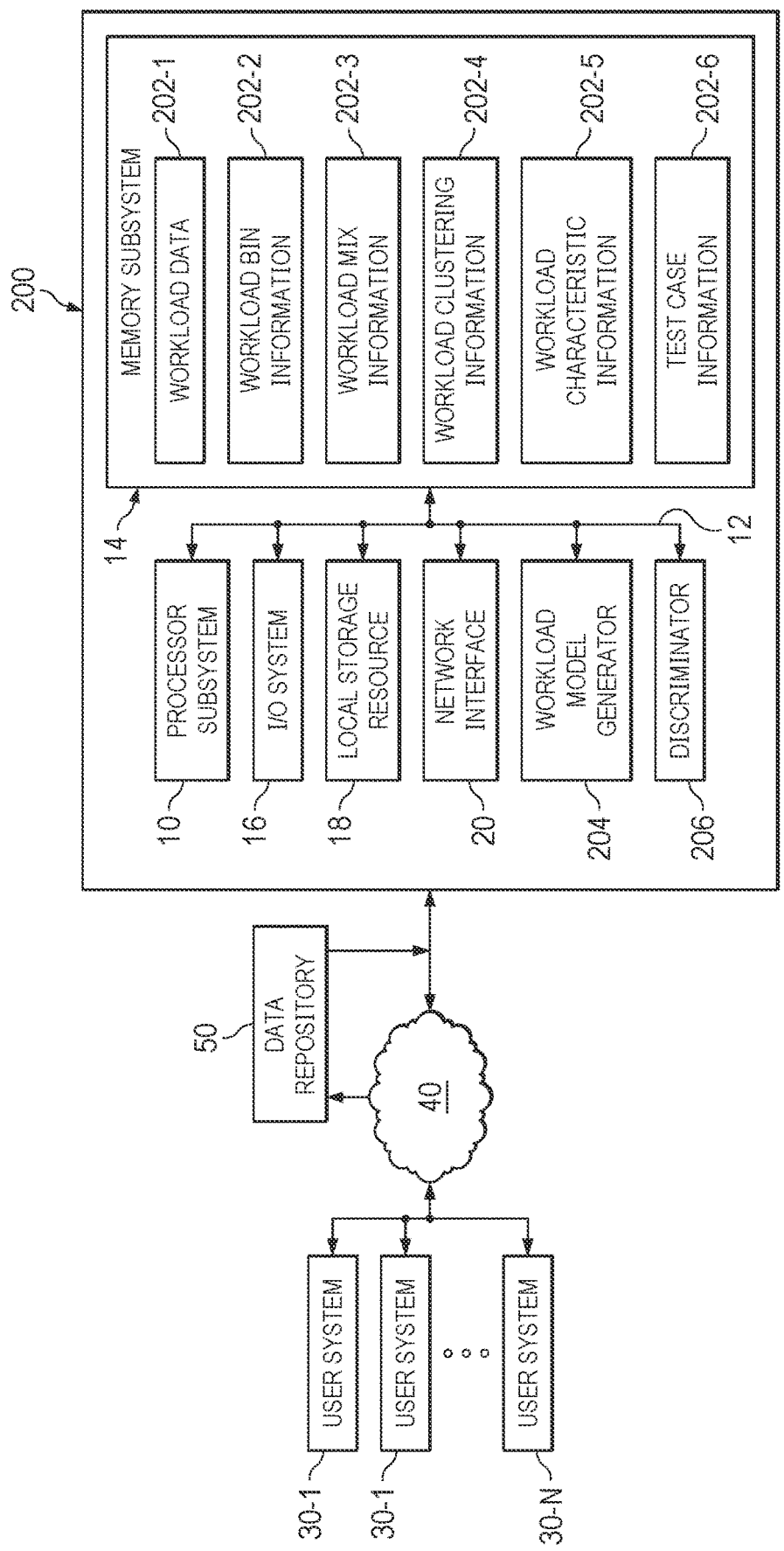
FIG. 2 is a schematic diagram of one embodiment of a system for identifying workload data and generating a plurality of test cases for multiple information handling systems.

FIG. 2 depicts one embodiment of a test case generation system for identifying workload data and generating a set of test cases 120 for a set of target information handling systems 102 based on the workload data.

Information from a plurality of information handling systems 102 may be stored in data repository 50 or communicated to test case test case information handling system 200. Each user system 104 may have one or more information handling systems 102 and may be associated with a customer 106 and/or an industry 108. Information handling systems 102 associated with a customer 106 may be configured based on the needs of the customer 106. Information handling systems 102 associated with an industry 108 may be configured based on the requirements of the industry 108. As such, information handling systems 102 may be configured to process information according to industry requirements, regulations, etc., regarding storage, networking or other processes, but may also be configured to process information according to customer operating procedures or protocols.

Components of test case test case information handling system 200 may include, but are not limited to, processor subsystem 10, which may comprise one or more processors, and system bus 12 that communicatively couples various system components to processor subsystem 10 including, for example, memory subsystem 14, I/O subsystem 16, local storage resource 18, and network interface 20.

Processor subsystem 10 may comprise a system, device, or apparatus operable to interpret and execute program instructions and process data, and may include a microprocessor, microcontroller, digital signal processor (DSP), application specific integrated circuit (ASIC), or another digital or analog circuitry configured to interpret and execute program instructions and process data. In some embodiments, processor subsystem 10 may interpret and execute program instructions and process data stored locally (e.g., in memory subsystem 14). In the same or alternative embodiments, processor subsystem 10 may interpret and execute program instructions and process data stored remotely (e.g., in a network storage resource).

System bus 12 may refer to a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

Memory subsystem 14 may comprise a system, device, or apparatus operable to retain and retrieve program instructions and data for a period of time (e.g., computer-readable media). Memory subsystem 14 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 200, is powered down. Memory subsystem 14 may include workload data storage 202-1 for storing workload data received from user systems 30 either directly over network 40 or via data repository 50, workload bin information storage 202-2 for storing workload bin information, workload mix information storage 202-3 for storing workload mix information, workload clustering information storage 202-4 for storing workload clustering information, workload characteristic information storage 202-5 for storing workload characteristic information and test case storage 202-6 for storing test case information, discussed in greater detail below. Memory subsystem 14 may store test case generator 204 and discriminator 206, discussed in greater detail below.

In test case information handling system 200, I/O subsystem 16 may comprise a system, device, or apparatus generally operable to receive and transmit data to or from or within test case information handling system 200. I/O subsystem 16 may represent, for example, a variety of communication interfaces, graphics interfaces, video interfaces, user input interfaces, and peripheral interfaces. In various embodiments, I/O subsystem 16 may be used to support various peripheral devices, such as a touch panel, a display adapter, a keyboard, a touch pad, or a camera, among other examples. In some implementations, I/O subsystem 16 may support so-called 'plug and play' connectivity to external devices, in which the external devices may be added or removed while test case information handling system 200 is operating.

Local storage resource 18 may comprise computer-readable media (e.g., hard disk drive, floppy disk drive, CD-ROM, and other type of rotating storage media, flash memory, EEPROM, or another type of solid-state storage media) and may be generally operable to store instructions and data.

Network interface 20 may be a suitable system, apparatus, or device operable to serve as an interface between test case information handling system 200 and a network (not shown). Network interface 20 may enable test case information handling system 200 to communicate over a network using a suitable transmission protocol or standard. In some embodiments, network interface 20 may be communicatively coupled via a network to a network storage resource (not shown). A network coupled to network interface 20 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and messages (generally referred to as data). A network coupled to network interface 20 may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), or any combination thereof. A network coupled to network interface 20 or various components associated therewith may be implemented using hardware, software, or any combination thereof.

Test case information handling system 200 may receive workload data from a plurality of user systems 30 having information handling systems 102 and develop a set of test cases comprising pluralities of workload mixes based on the workload data.

Figure 3:
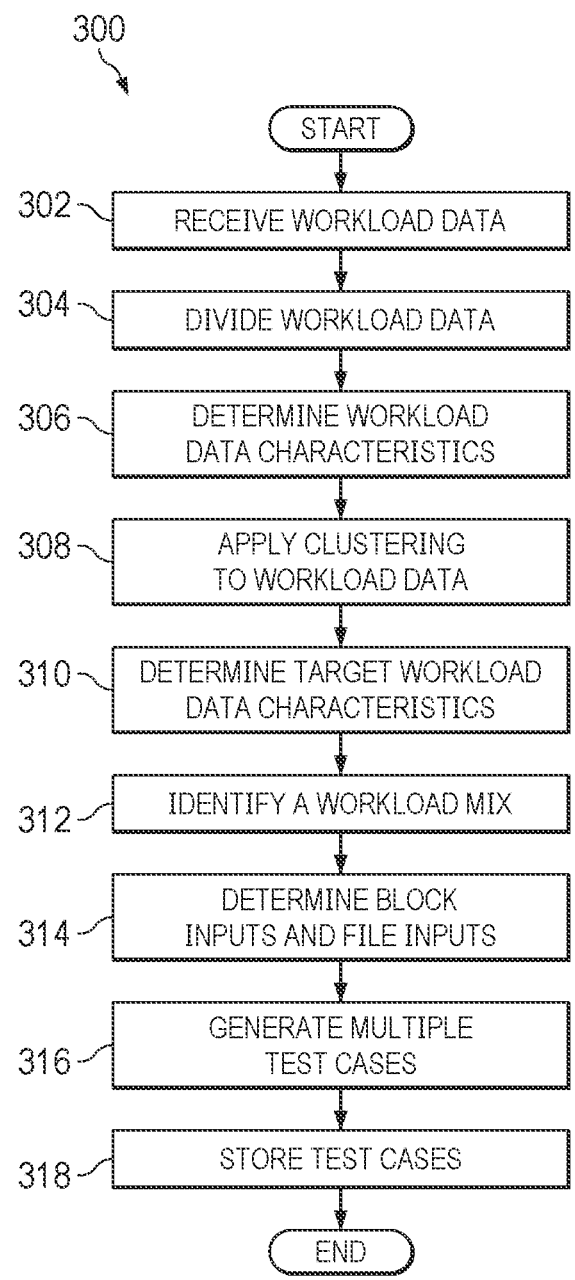
FIG. 3 is a flow diagram illustrating a method for determining a plurality of test cases for multiple information handling systems.

FIG. 3 depicts a flow diagram 300, illustrating a method for generating a set of test cases for a set of target information handling systems.

The method may begin at step 302 with test case information handling system 200 receiving workload data from a plurality of user systems 30. Workload data may be provided in real-time or near real-time. Each user system 30 may include a single stand-alone information handling system 102, correspond to an array of information handling systems 102 associated with a customer 106, correspond to a plurality of information handling systems 102 associated with an industry 108, or some other set of information handling systems 102.

At step 304, test case information handling system 200 may store the workload data in workload data storage 202-1 and divide the workload data into a plurality of workload data bins. For example, test case information handling system 200 may use workload characteristics such as % READ and IO (input/output) size for dividing workload data from hundreds or thousands of information handling systems 102 into workload data bins.

FIG. 4 depicts graph 400 illustrating a plurality of workload data points 406 representing workload data received from user systems 30, wherein each workload data point 406 may be plotted against queuing curve 408 determined for a workload data characteristic (e.g., 50-60% READ operations). In some embodiments, test case information handling system 200 may execute an algorithm based on queuing theory to divide workload data points 406 stored in workload data storage 202-1 into a plurality of workload data bins. Using the algorithm, latency 404 may be determined for workload data points 406 having different values for a second workload data characteristic (e.g., IOPS (inputs/outputs per second), which may be a way to further divide workload data points into workload data bins.

FIG. 5 depicts example data structures 500-1 and 500-2 containing workload data characteristics (e.g., % READ and IO size) for determining how to divide the workload data points 406 stored in workload data storage 202-1 into the workload data bins. Data structure 500-1 contains ten rows 502-1 to 502-10 for characterizing workload data based on % READ operations. Data structure 500-2 contains twelve rows 504-1 to 504-12 for characterizing workload data based on IO size (e.g., the number of IO operations). Using this example, test case information handling system 200 may allocate memory in workload bin information storage 202-2 based on the number of combinations of workload data characteristics (e.g., 10×12=120 workload data bins).

Still referring to method 300 and FIG. 5, FIG. 6 depicts a portion of a sample data structure 600 for storing workload data characteristic information for each workload data bin determined in FIG. 5. As depicted in FIG. 6, data structure 600 may contain 120 rows based on data structure 500-1 having ten rows and data structure 500-2 having twelve rows. As an example, row 604-1 contains workload data characteristic information for a workload data bin in which each workload data point 406 may be characterized as having 0-10% READ operations and up to 5K IO size. Data structure 600 may be stored in workload bin information storage 202-2.

At step 306, test case information handling system 200 may analyze all or a portion of the workload data stored in the workload data bins to identify workload characteristics associated with a single information handling system 102, workload characteristics for information handling systems 102 associated with user system 104, workload characteristics for information handling systems 102 associated with a customer 106, workload characteristics for information handling systems 102 associated with an industry 108 or workload characteristics for all information handling systems 102, for example.

As used herein, the term "workload data characteristics" may refer to characteristics of workload data received from user systems 30, whereas the term "workload characteristics" may refer to characteristics of workloads associated with a target information handling system 102.

At step 308, test case information handling system 200 may apply clustering to the workload data in the plurality of workload data bins or a portion of the workload data based on a single information handling system 102, a user system 104 having one or more information handling systems 102, a customer 106 having one or more user systems 104, an industry 108 having one or more customers 106, or some other criteria. Test case information handling system 200 may apply clustering to identify workloads that may apply to information handling systems 102 in different user systems 104, different customers 106, different industries 108, or some other criteria.

At step 310, test case information handling system 200 may analyze the clusters of workload data and associated workload data characteristics to determine a set of workload characteristics in order to generate a workload mix.

For example, test case information handling system 200 may analyze the workload data characteristics corresponding to each row 604 to determine an operations type (e.g., a READ operation, a WRITE operation or an APPEND operation type), an IO pattern (e.g., sequential or random) and a file system type (e.g., a tree depth, a tree width, the number of files per folder, etc.) and determine a set of workload data characteristics for each cluster of workload data and determine a workload characteristic for a target information handling system 102 that might be expected to process the workload data.

FIG. 7 depicts data structure 700 containing workload characteristics for user systems 104 for a period (e.g., 24 hours, last 30 days, etc.), wherein columns 704 contain user information (e.g., values in column 704-1 identify different customers 106 (e.g., user systems C1-CN) associated with information handling systems 102, values in column 704-2 identify different industries 108 (e.g., industries I1, I2 . . . IN) with information handling systems 102, and values in column 704-3 identify different user systems 104 (e.g., user systems S1, S2 . . . SN) with information handling systems 102. Columns 706 may correspond to rows 604 in data structure 600. For example, row 702-1 may correspond to a first information handling system 102 associated with a first customer 106 (e.g., customer value "C1" may refer to a first customer C1) in a first industry 108 (e.g., industry value "I1" may correspond to healthcare, industry value "I2" may correspond to shipping, etc.) and column 704-3 may contain system information 104 (e.g., system value "S1" may correspond to an information handling system 102 for a user networking system 104, system value "S2" may correspond to an information handling system 102 for a user storage system 104, etc.).

In some embodiments, a cell in data structure 700 may have a value indicating there are a substantial number of workload data points 406 in a workload data bin corresponding to a cell in a row 604 in FIG. 6. For example, referring to row 702-1, a cell corresponding to column 706-1 may include a value of "1" to indicate that, for system S1 associated with Customer C1 in industry I1, there is a substantial number of workload data points 406 in a corresponding cell in a row 604 in FIG. 6. Still referring to row 702-1, a cell corresponding to column 706-39 may include a value of "0" to indicate that, for system S1 associated with Customer C1 in industry I1, there is not a substantial number of workload data points 406 in a cell corresponding to a row 604 in FIG. 6. A substantial number may refer to a percentage of the total number of workload data points 406 or a specific number. In some embodiments, a substantial number of workload data points 406 may be in excess of 1,000 workload data points, wherein 1,000 workload data points may be referred to as a threshold number of workload data points 406. More or fewer workload data points 406 may be considered a threshold number.

In some embodiments, if there are less than a threshold number of workload data points 406 corresponding to a cell in a row 604 in FIG. 6, some embodiments may not include a value in a corresponding cell in data structure 700. For example, still referring to row 702-1, a cell corresponding to column 706-42 may not include a value to indicate that, for system S1 associated with Customer C1 in industry I1, the number of workload data points 406 having a combination of 60-70% READ operations and between 10-25K IO size in a cell in a row 604 in data structure 600 is below a threshold number.

Still referring to method 300, at step 312, test case information handling system 200 may identify a set of workload mixes, discussed in greater detail below.

At step 314, embodiments may determine block inputs and file inputs for each workload mix.

Block inputs may include, for example, % READ, IO size, a number of threads, and a pattern. A % READ block input may have a type (e.g., workload mix) and a value (e.g., 50%). An IO size block input may have a type (e.g., workload mix) and a value (e.g., 4K, 8K, etc.). A number of threads block input may have a type (e.g., numerical) and a value (e.g., 1-100). A pattern block input may have a type (e.g., binary) and indicate a pattern (e.g., random/sequential).

File inputs (also referred to as FileSystem or FS inputs) may include, for example, a % READ file input, an IO size file input, an operation file input, a data/metadata file input, a protocol file input, and a pattern file input. A % READ file input may have a type (e.g., workload mix) and a percentage of READ operations (e.g., 50%). An IO size file input may have a type (e.g., workload mix) and a value (e.g., 4K, 8K, etc.). An operation file input may have a type (e.g., categorical) and include an operation (e.g., READ, WRITE, APPEND). A data/metadata file input may have a type (e.g., categorical) and a value (e.g., headers, get attributes, set attributes, etc.). A protocol file input may have a type (e.g., binary) and an indicator (e.g., CIFS (Common Internet File System) or NFS (Network File System)). A pattern file input may have a type (e.g., binary) and indicate a pattern (e.g., random/sequential).

At step 316, test case information handling system 200 may generate a set of test cases, wherein each test case may be applicable to all information handling systems 102, a set of target information handling systems 102 associated with an industry 108, a set of target information handling systems 102 associated with a customer 106, a set of target information handling systems 102 associated with a user system 104, or a single target information handling system 102. For example, test case information handling system 200 may determine that workload data for all information handling systems 102 have a % READ workload characteristic that is at least 50% READ operations and generate a set of test cases with workload mixes that collectively have greater than 50% READ operations. Each workload mix in a set of test cases may have greater than 50% READ operations but vary in other respects, such as IO size, IO pattern (e.g., sequential and/or random data sets), file structure (including, for example, file depth, file width or files per folder), or other workload characteristics.

A set of test cases for a set of target information handling systems 102 associated with a first user system 104-1, a first customer 106-1 or a first industry 108-1 may differ from a set of test cases for a set of target information handling systems 102 associated with a second user system 104-2, a second customer 106-2 or a second industry 108-2. Different test cases may include a different number of workload mixes, use different workload data, have different block inputs and file inputs and different workload characteristics.

At step 318, embodiments determine if a test case is accurate, discussed in greater detail below.

If the test case is accurate, then at step 320, embodiments may store the test case and the workload mixes and store the test case and may indicate the test case is available to deploy.

One or more of steps 304-314 may be repeated to generate additional workload mixes and/or additional test cases at step 316 and determine if each test case is accurate.

Determining a Set of Test Cases

In some embodiments, test case information handling system 200 may determine a set of test cases for a set of target information handling systems 102. For example, test case information handling system 200 may determine that information handling systems 102 generally process workload data with a % READ workload characteristic that is at least 50% READ operations, may determine that a workload characteristic for a set of target information handling systems 102 for an industry 108 (e.g., cellular service providers) may be at least 70% READ operations and further determine that a workload characteristic for a set of target information handling systems 102 for a particular customer 106 (e.g., a cellular service provider) may be at least 80% READ operations. Thus, a test case for any information handling system 102 may have a workload characteristic that is at least 50% READ operations, a test case for a set of target information handling systems 102 for any customer 106 in an industry 108 may have a workload characteristic associated with at least 70% READ operations but a test case for a set of target information handling systems 102 (e.g., S1) for a particular user system 104 for a particular customer 106 may have a workload characteristic associated with at least 80% READ operations.

Figure 8:
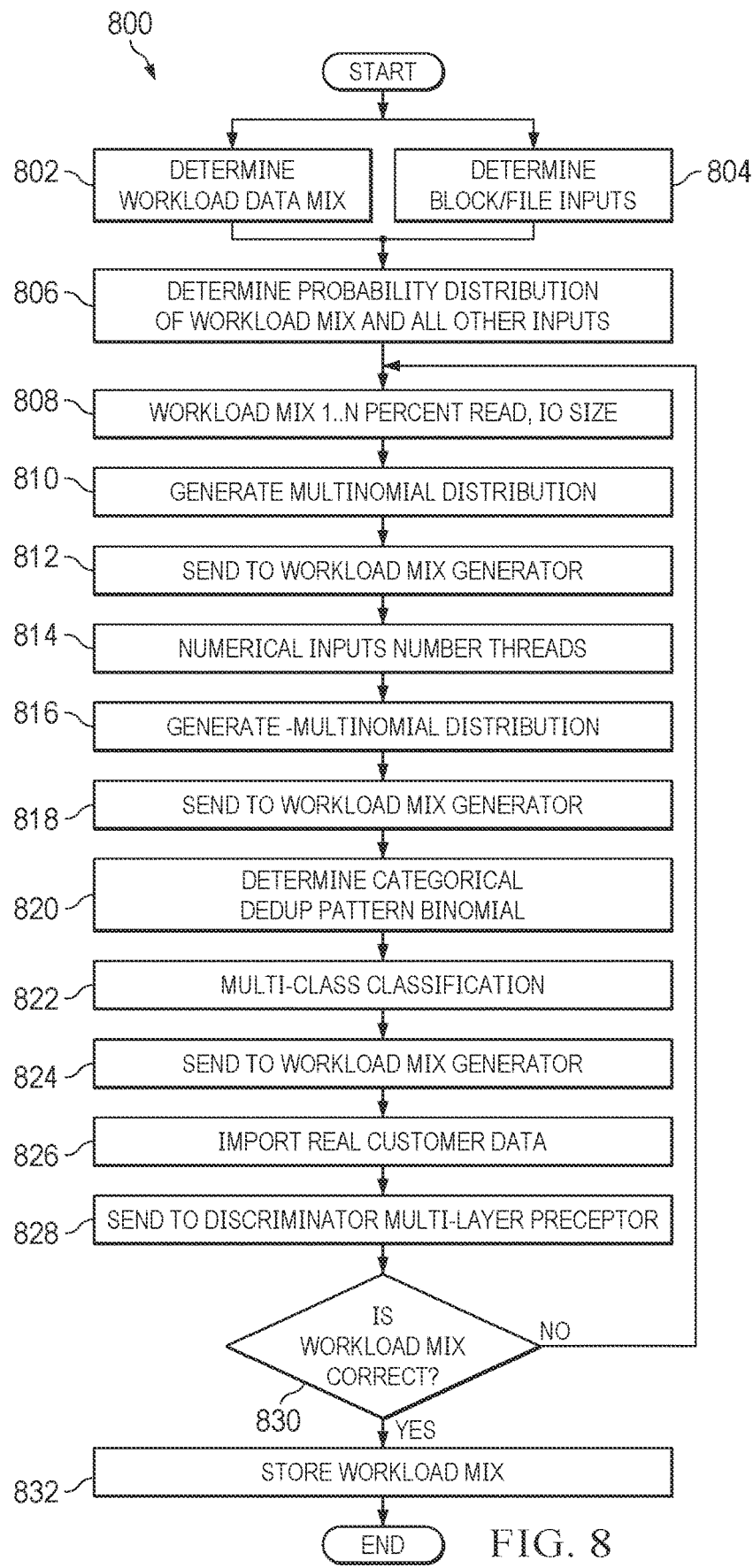
FIG. 8 depicts a flow diagram for developing a plurality of test cases for multiple information handling systems.

FIG. 8 depicts a flow diagram 800, illustrating a method for generating a set of test cases, with each test case comprising a plurality of workload mixes.

At step 802, embodiments may use data structure 700 to determine a workload mix, wherein the workload mix may be based on cells in columns 706, a user system 104 and/or a customer 106 and/or an industry 108 and the set of target information handling systems 102. For example, a test case for a set of target information handling systems 102 may be based on the user system 104 being associated with networking operations, wherein a set of target information handling systems 102 used for networking operations may have workload characteristics of more than 60% READ operations and an average IO size between 100-200K in a 24-hour time period, but the set of target information handling systems 102 may process workloads that range from 0-100% READ operations with IO sizes in a range of <5K IOPS up to >5M IOPS. A test case for a set of target information handling systems 102 in a user system 104 associated with networking may therefore include a workload data mix based on a 24-hour time period. Using cells in data structure 700, embodiments may determine a test case should include a workload mix with 10-20% READ operations and less than 5K IO size and 40-50% and 50-60% READ operations with IO size 10-25K but not include a workload mix with 30-40% READ operations with IO size between 10-25K.

At step 804, embodiments may determine a set of block inputs and file inputs for a workload mix. Block inputs may include information such as workload data that is transferred in blocks from a file with no conversion and may not have formatting. File inputs may refer to inputs associated with data. For example, a file input may include an operations type, such as a READ operation, a WRITE operation or an APPEND operation, may include data and/or metadata, may identify an IO pattern, such as sequential or random, or may include a file system structure, such as a tree depth, a tree width, or a number of files per folder, for example. The block and file inputs may affect how much processing is required. For example, a READ operation may include a file input that specifies a path. A READ operation for a first user system 104 may have a complex file path that requires more processing steps and a READ operation for a second user system 104 may have a simpler file path that requires fewer processing steps.

At step 806, embodiments may calculate a probability distribution for the workload mix including other inputs such as the block inputs and the file inputs. Referring back to FIG. 7, for a set of target information handling systems 102 for user systems 104 for customers 106 in an industry 108, embodiments may determine that there is a higher probability that an information handling system 102 used by first customer 106 (e.g., customer C1) will process workload data having a % READ of 50-60% and an IO size of 10-25K and a lower probability that an information handling system 102 used by the same customer 106 will process workload data having a % READ of 40-50% and an IO size of 10-25K. No values in column 706-42 indicate there might not be enough workload data points 406 to determine a probability that a set of target information handling system 102 used by customer 106 will process workload data having a % READ of 60-70% and an IO size of 10-25K.

At step 808, embodiments may determine a workload mix based on rows 702 in data structure 700 and the probability distribution of each workload mix. Continuing the example, test case information handling system 200 may determine a test case for a set of target information handling systems 102 should include more workload mixes having a % READ of 50-60% and an IO size of 10-25K and fewer workload mixes having a % READ of 40-50% and an IO size between 10-25K.

At step 810, embodiments may generate a multinomial distribution on the workload mix. In some embodiments, test case information handling system 200 may generate a multinomial distribution to account for some cells in data structure 700 not having any values.

At step 812, embodiments may send the workload mix and the multinomial distribution to test case generator 204. In some embodiments, test case generator 204 may generate a mix based on the workload data received from all information handling systems 102 and store the workload mix in test case information storage 202-6. However, variations in workload data associated with different user systems 104, customers 106 and industries 108 means a single workload mix might be accurate for a basic information handling system 102 but may be inaccurate for a set of target information handling system 102 in a particular industry 108 or used by a particular customer 106 or in a particular user system 104. In some embodiments, test case generator 204 uses a Long Short-Term Memory (LSTM) network and machine learning (ML) to refine workload mixes.

At step 814, embodiments may generate a set of numerical inputs for the workload mix. In some embodiments, test case generator 204 may use LSTM and ML to learn order dependence and predict sequences for a particular industry 108, a particular customer 106, a particular user system 104 or a particular information handling system 102.

At step 816, embodiments may generate a multinomial distribution on the workload mix based on the set of numerical inputs.

At step 818, embodiments may send the workload mix and the multinomial distribution based on the numerical inputs to test case generator 204. In some embodiments, test case generator 204 uses a Long Short-Term Memory (LSTM) network and machine learning (ML) to refine test cases based on the multinomial distribution and the set of numerical inputs.

At step 820, embodiments may determine a categorical dedup pattern binomial for a workload mix. Large workload data sets can have patterns. To avoid a workload mix or test case from having overly redundant workload data sets taking up large amounts of memory, embodiments may determine if there are patterns and determine a dedup pattern binomial.

At step 822, embodiments may generate a multi-class classification on a workload mix based on the categorical dedup pattern binomial.

At step 824, embodiments may send the workload mix to test case generator 204. Test case generator 204 may generate a test case for a set of target information handling systems 102 based on the workload mix, the multinomial distribution, the set of numerical inputs for the workload mix, the categorical dedup pattern binomial for the workload mix and the multi-class classification on the workload mix based on the categorical dedup pattern binomial.

At step 826, embodiments may import user workload data to test case generator 204. In some embodiments, if the workload mix is based on a period (e.g., 30 days), user workload data for a period (e.g., 30 days) may be imported. User workload data may be actual data imported in real-time or near real-time.

At step 828, embodiments may send a workload mix with the imported customer data to discriminator 206. Discriminator 206 may comprise a multi-layer preceptor for comparing real and generated workload data to ensure the workload data is accurate.

At step 830, embodiments may determine if the workload mix is accurate. In some embodiments, determining if a workload mix is accurate may involve discriminator 206 determining if a set of target information handling systems 102 can process the imported data according to the workload mix. In some embodiments, determining if a workload mix is accurate may involve discriminator 206 determining if a workload mix is accurate for multiple workloads. In some embodiments, determining if a workload mix is accurate may involve discriminator 206 determining if a workload mix is accurate for a set of target information handling systems 102 associated with a user system 104, a customer 106 or an industry 108. For example, a user system 104 may include information handling systems 102 for networking and storage systems, wherein determining if a workload mix is accurate may involve discriminator 206 determining if the workload mix is accurate for a networking information handling system 102 and/or storage information handling systems 102.

If a workload mix is not accurate, embodiments may repeat any of steps 808-828 until the workload mix is accurate. In some embodiments, if the workload mix is not accurate, changes may be implemented to one or more of the workload data characteristics or workload bin information. For example, a period may be increased to collect more workload data points 406 or may be decreased to collect more recent workload data points 406, or the division between workload data bins may be increased (e.g., increase the number of rows 502 or 504 in data structures 500) for more granularity or decreased (e.g., decrease the number of rows 502 or 504 in data structures 500) to include more workload data points 406 in each workload data bin.

If the workload mix is accurate, then at step 832, embodiments may store the workload mix and indicate the workload mix is ready to deploy in a test case. A workload mix may be stored in workload mix information storage 202-6 for using as a basis for generating workload mixes for other information handling systems 102 associated with a user system 104, a customer 106 or an industry 108.

Each test case may have a set of workload mixes based on a set of target information handling system 102, a user system 104, a customer 106 or an industry 108. Test cases for different information handling systems 102 in the same user system 104 may include different sets of workload mixes (including more or fewer workload mixes). Test cases for different user systems 104 associated with the same customer 106 may include different sets of workload mixes. Test cases for different customers 106 associated with the same industry 108 may include different sets of workload mixes. Test cases for different industries 108 may include different sets of workload mixes.

Embodiments may use machine learning to compare workload mixes in different test cases stored in test case information storage 202-6 to identify trends in workload data and refine future test cases for greater accuracy. In some embodiments, when an information handling system 102 is being designed or manufactured, test case information handling system 200 may determine a user system 104, a customer 106 (or potential customer) or an industry 108 associated with information handling system 102 and deploy a test case to information handling system 102 over a network or to an information handling system (not shown) associated with manufacturing or validating information handling system 102, wherein the information handling system 102 being manufactured or validated may need to process the set of workload mixes to be validated. In some embodiments, when information handling system 102 is delivered to a user and connected to a network, test case information handling system 200 may deploy a test case (which could be the same test case used to validate information handling system 102 or a different test case) to the information handling system 102 associated with the customer 106 so the user can verify one or more information handling systems 102 will meet their needs. In some embodiments, when a test case is deployed, test case information handling system 200 may provide real-time workload data or near real-time workload data retrieved from data repository 50 or may provide workload data stored in workload data storage 202-1. In some embodiments, multiple sets of test cases may be deployed to a set of target information handling systems 102 and the set of target information handling systems 102 may be monitored to determine how effectively the information is processed relative to performance thresholds. The set of target information handling systems 102 may be as few as a single information handling system 102 or several thousand information handling systems 102. Each target information handling system 102 in the set of target information handling systems 102 may communicate results back to test case information handling system 200 for further refinement of a workload mix, a test case, or to identify emerging trends in data processing that a set of target information handling systems 102 will need to accommodate.

The above disclosed subject matter is to be considered illustrative, and not restrictive, and the appended claims are intended to cover all such modifications, enhancements, and other embodiments which fall within the true spirit and scope of the disclosure. Thus, to the maximum extent allowed by law, the scope of the disclosure is to be determined by the broadest permissible interpretation of the following claims and their equivalents, and shall not be restricted or limited by the foregoing detailed description.

The invention claimed is:

1. A method of generating a set of test cases for a set of target information handling systems, the method comprising:
    receiving workload data corresponding to a plurality of information handling systems;
    dividing the workload data into a plurality of workload data bins, wherein each workload data bin contains a portion of the workload data based on at least one workload data characteristic of a plurality of workload data characteristics;
    clustering the portion of the workload data in each workload data bin of the plurality of workload data bins based on a set of workload characteristics for a set of target information handling systems;
    determining a plurality of workload mixes based on the plurality of workload data bins and the set of workload characteristics;
    generating a set of test cases for the set of target information handling systems, wherein each test case comprises a set of workload mixes of the plurality of workload mixes;
    deploying a test case of the set of test cases over a network at the set of target information handling systems;
    determining whether the set of workload mixes of the test case is accurate for the set of target information handling system by determining whether the set of target information handling systems are able to process the set of workload mixes of the test case; and
    determining that the set of workload mixes of the test case are not accurate for the set of target information handling system, and in response:

adjusting one or more of the set of workload characteristics of the set of workload mixes;

generating additional sets of test cases, based on the adjusted one or more of the set of workload characteristics of the set of workload mixes, for the set of target information handling system; and deploying the additional set of tests cases over the network at the set of target information handling systems.

2. The method of claim 1, wherein dividing the workload data into the plurality of workload data bins comprises executing an algorithm based on a queuing theory.

3. The method of claim 1, further comprising determining a set of block inputs and a set of file inputs for the workload data, wherein a workload mix of the plurality of workload mixes comprises the set of block inputs and the set of file inputs.

4. The method of claim 1, wherein clustering comprises K-means clustering.

5. The method of claim 1, wherein receiving the workload data comprises receiving the workload data for a period from a data repository.

6. The method of claim 1, further comprising deploying a test case of the set of test cases to the set of target information handling systems, wherein the workload data comprises real-time or near-real time workload data.

7. The method of claim 1, further comprising determining the set of workload characteristics for the set of target information handling systems, wherein each workload characteristic is associated with one or more of a user system, a customer, and an industry.

8. An information handling system comprising a processor and memory media, the processor having access to the memory media, the memory media storing instructions executable by the processor to perform operations, comprising:

receive workload data corresponding to a plurality of information handling systems;

divide the workload data into a plurality of workload data bins based on at least one workload data characteristic of a plurality of workload data characteristics, each workload data bin containing a portion of the workload data;

cluster the portion of the workload data in each workload data bin of the plurality of workload data bins based on a set of workload characteristics for a set of target information handling systems;

determine a workload mix based on the plurality of workload data bins and the set of workload characteristics;

generate a set of test cases for the set of target information handling systems, wherein each test case comprises a set of workload mixes of the plurality of workload mixes;

deploying a test case of the set of test cases over a network at the set of target information handling systems;

determining whether the set of workload mixes of the test case is accurate for the set of target information handling system by determining whether the set of target information handling systems are able to process the set of workload mixes of the test case; and determining that the set of workload mixes of the test case are not accurate for the set of target information handling system, and in response:

adjusting one or more of the set of workload characteristics of the set of workload mixes;

generating additional sets of test cases, based on the adjusted one or more of the set of workload characteristics of the set of workload mixes, for the set of target information handling system; and deploying the additional set of tests cases over the network at the set of target information handling systems.

9. The information handling system of claim 8, wherein the information handling system is configured to execute an algorithm based on queuing theory to divide the workload data into the plurality of workload data bins.

10. The information handling system of claim 8, wherein the information handling system is configured to determine a set of block inputs and a set of file inputs for the workload data, wherein the test case comprises the set of block inputs and the set of file inputs.

11. The information handling system of claim 8, wherein the information handling system is configured to cluster the workload data based on K-means clustering.

12. The information handling system of claim 8, wherein the system further comprises a data repository, wherein the information handling system is configured to receive the workload data from the data repository, and wherein the workload data corresponds to a time period.

13. The information handling system of claim 12, wherein the information handling system is configured to communicate with the data repository to receive real-time or near-real time workload data and deploy the test case to the target information handling system.

14. The information handling system of claim 8, wherein the information handling system is configured to determine a set of workload characteristics for the set of target information handling systems, wherein each workload characteristic is associated with one or more of a user system, a customer, and an industry.

15. A test case information handling system for generating a test case for a set of target information handling systems, the test case information handling system comprising:

a memory device configured to:
store workload data corresponding to a plurality of information handling systems; and a processor configured to execute instructions to:
divide the stored workload data into a plurality of workload data bins based on at least one workload data characteristic of a plurality of workload data characteristics, each workload data bin containing a portion of the workload data;

cluster the portion of the workload data in each workload data bin of the plurality of workload data bins based on a set of workload characteristics for the set of target information handling systems;

determine a workload mix based on the plurality of workload data bins and the set of workload characteristics; and generate the test case for the set of target information handling systems using the workload mix;

deploying a test case of the set of test cases over a network at the set of target information handling systems;

determining whether the set of workload mixes of the test case is accurate for the set of target information handling system by determining whether the set of target information handling systems are able to process the set of workload mixes of the test case; and determining that the set of workload mixes of the test case are not accurate for the set of target information handling system, and in response:

adjusting one or more of the set of workload characteristics of the set of workload mixes;

generating additional sets of test cases, based on the adjusted one or more of the set of workload characteristics of the set of workload mixes, for the set of target information handling system; and deploying the additional set of tests cases over the network at the set of target information handling systems.

16. The test case information handling system of claim 15, configured to execute an algorithm based on queuing theory to divide the workload data into the plurality of workload data bins.

17. The test case information handling system of claim 15, configured to determine a set of block inputs and a set of file inputs for the workload data, wherein the test case comprises the set of block inputs and the set of file inputs.

18. The test case information handling system of claim 15, configured to cluster the workload data based on K-means clustering.

19. The information handling system of claim 15, configured to receive the workload data from a data repository, wherein the workload data corresponds to a period.

20. The test case information handling system of claim 19, further configured to:

communicate with the data repository to receive real-time or near-real time workload data; and deploy the test case to the target information handling system.

* * * * *